US008781886B2

(12) United States Patent
Penke et al.

(10) Patent No.: US 8,781,886 B2
(45) Date of Patent: Jul. 15, 2014

(54) GRAPHICAL USER INTERFACE FOR PRESENTING IMAGE EVALUATION INFORMATION

(75) Inventors: Mark S. Penke, West Henrietta, NY (US); Donald A. Brown, Honeoye Falls, NY (US); Sarah E. Campbell, Rochester, NY (US); Cornell Juliano, Churchville, NY (US); David M. Parsons, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 2025 days.

(21) Appl. No.: 11/717,855

(22) Filed: Mar. 14, 2007

(65) Prior Publication Data

US 2008/0228555 A1 Sep. 18, 2008

(51) Int. Cl.
*G06F 11/00* (2006.01)
*G06Q 30/00* (2012.01)

(52) U.S. Cl.
CPC .................................... *G06Q 30/00* (2013.01)
USPC ............................................................ 705/12

(58) Field of Classification Search
CPC ................................................. G06Q 30/0203
USPC ................................................................ 705/12
See application file for complete search history.

(56) References Cited

U.S. PATENT DOCUMENTS

| 6,937,913 | B2 | 8/2005 | Nishikawa et al. |
| 7,016,882 | B2 | 3/2006 | Afeyan et al. |
| 7,098,997 | B2 * | 8/2006 | Shirai et al. .................. 356/3.01 |
| 2002/0007303 | A1 * | 1/2002 | Brookler et al. ................ 705/10 |
| 2005/0261953 | A1 | 11/2005 | Malek et al. |
| 2006/0116930 | A1 | 6/2006 | Goldstein |
| 2006/0242098 | A1 * | 10/2006 | Wnek ............................. 706/45 |
| 2007/0220540 | A1 * | 9/2007 | Walker et al. ................... 725/14 |

* cited by examiner

*Primary Examiner* — Charles C Agwumezie
(74) *Attorney, Agent, or Firm* — MH2 Technology Law Group LLP (57) ABSTRACT

A method is disclosed for operating a computer to transform and present data gathered from respondents to electronic surveys and to evaluate preferences related to digital two dimensional and three dimensional images. The method includes receiving computational results for an electronic survey in the form of data files, which include one or more cluster scores for clusters identified in an image presented in the electronic survey. The computational results are transformed for presentation on a graphical user interface. The method provides a summary of the computational results for all images viewed in the survey and detailed survey results for selected images from the survey. The method further provides formatting options for presentation of the computational results, with the formatting options including mode selection, cluster selection, and data display adjustment. The final formatted computational results are presented on the graphical user interface for review by an operator.

25 Claims, 10 Drawing Sheets

GRAPHICAL USER INTERFACE FOR PRESENTING IMAGE EVALUATION INFORMATION

CROSS-REFERENCE TO RELATED APPLICATIONS

The following co-pending applications, U.S. application Ser. No. 11/717,856, filed Mar. 14, 2007, titled "Graphical User Interface for Gathering Image Evaluation Information", and U.S. application Ser. No. 11/724,008, filed Mar. 14, 2007, titled "Method and System for Image Evaluation Data Analysis", are assigned to the same assignee of the present application. The entire disclosures of these co-pending applications are totally incorporated herein by reference in their entireties.

BACKGROUND AND SUMMARY

This disclosure relates generally to computer software and systems, particularly business application software and systems, and more particularly graphical user interfaces for the data output presentation of electronic survey preferences related to two-dimensional and three-dimensional images.

Product manufacturers operating globally utilize market research studies to obtain direct feedback about customer needs, values, and buying trends. For the purposes of such organizations, it is critical that these design considerations reflect the perspectives of all of a corporation's primary markets. Market research studies have taken several forms in an effort to identify product features that would be useful to and preferred by the widest customer population. For example, such studies have included focus groups, analysis of calls to customer service, interviews with industry experts, questionnaires/surveys, product testing, ethnographic techniques, among others. In one form, surveys containing images of proposed design concepts are presented to respondents in a hard copy format to solicit comments. Respondents comment on the various images by circling areas that they like or dislike as regarded such items as form factors or visual color changes and add written comments explaining their perspectives. This feedback is then collected, and the results are collated manually. Although much useful data may be gathered using this method, it presents several significant problems. The most serious include high analysis costs, difficulty in identifying meaningful patterns, limited survey distribution, and the extended amount of time necessary to complete the test itself.

Computer based survey tools have also been utilized to obtain customer data. Although computer surveys offered the benefits of electronic data collection and wider survey distribution, there was no means for respondents to physically draw and write on pages. Considering the visual and actual complexity of business products such as copiers, printers, and multi-function devices, useful design feedback and insights must necessarily be specific.

While these tools are useful, the product design process requires a high degree of specificity in obtaining actionable information relative to product appearance and architecture, and it is necessary that it include users worldwide. The survey respondent needs the ability to identify specific areas of images and to provide comments relative to those areas. No existing survey applications permit respondents to draw on images to specify areas of interest and then comment on those areas. Nor are existing tools able to compile and analyze such data, in an accurate and easy comprehended manner.

To meet the needs of development of visually and operationally complex business products being marketed internationally, it would be desirable to have a market research tool that provides electronic distribution, worldwide participation, data security, ease of use, enabling of the positive or negative designation of any area of an image, enabling of association of specific comments to designated areas, quick, accurate, and cost effective analysis of the data, and visual presentation of the results in a clear, meaningful, and useful way.

All U.S. patents and published U.S. patent applications cited herein are fully incorporated by reference and are included only for purposes of adding alternative embodiments and are not intended to define or narrow the claim terms as set forth herein. The following patents or publications are noted.

U.S. Pat. No. 6,937,913 to Nishikawa et al. ("Product Design Process and Product Design Apparatus") describes a product design process and apparatus for defining an optimal product concept capable of conveying customer satisfaction. The process includes analysis of wants and needs information, and, based on the analysis, weighting is carried out with respect to evaluation indices which have been previously stored in a storage device. The wants and needs information includes quantitative measures of the degree to which the user is likely to perceive a benefit latent in the product under consideration and inherent in the wants and needs information. An evaluation index is selected from among a plurality of weighted evaluation indices and a product design concept for which the primary evaluation index selected is a maximum or minimum is defined.

U.S. Pat. No. 7,016,882 to Afeyan et al. ("Method and Apparatus for Evolutionary Design") describes generating and presenting, typically electronically, a number of design alternatives to persons who are participating in a design, selection, or market research exercise. The respondents transmit data indicative of their preferences among or between the presented design alternatives, and that data is used to derive a new generation of design alternatives or proposals. The new designs are generated through the use of a computer program exploiting a genetic or evolutionary computational technique. The process is repeated, typically for many iterations or cycles.

U.S. Published Patent Application No. 2005/0261953 to Malek et al. ("Determining Design Preferences of a Group") teaches a method for generating and presenting, typically electronically, generations of design alternatives to persons participating in the design, selection, or market research exercise. The respondents transmit data indicative of their preferences among or between the presented design alternatives. Some of the data is used to conduct a conjoint analysis or non-convergent exercise to investigate the drivers of the preferences of the group or its members, and at least a portion are used to derive follow-on generations of design alternatives or proposals. The follow-on designs are preferably generated through the use of an evolutionary or genetic computer program, influenced by the respondents' preferences. The process results in the generation of one or more preferred product forms and information permitting a better understanding of what attributes of the product influence the preferences of the test group members.

U.S. Published Patent Application No. 2005/0261953 to Goldstein ("Computer System and Method for Development and Marketing of Consumer Products") describes a computer-implemented method for the design and/or marketing of one or more consumer products based on an identified Icon includes capturing and storing in memory preferences of the Icon in accordance with at least one systematic survey of some of the preferences. One or more designs are created for a consumer product or for a space or scheme for a marketing promotion. The consumer product or space/scheme is stored in memory. The preferences may include aspects of a product or space and information regarding the background of the Icon.

The disclosed embodiments provide examples of improved solutions to the problems noted in the above Background discussion and the art cited therein. There is shown in these examples an improved method for operating a computer to transform and present data gathered from respondents to electronic surveys and to evaluate preferences related to digital two dimensional and three dimensional images. The method includes receiving computational results for an electronic survey in the form of data files, which include one or more cluster scores for clusters identified in an image presented in the electronic survey. The computational results are transformed for presentation on a graphical user interface. The method provides a summary of the computational results for all images viewed in the survey and detailed survey results for selected images from the survey. Parameter filters, dependent on the characteristics of the images in the survey and on data captured about the respondents to the survey, are provided to narrow the results presentation. The method further provides formatting options for presentation of the computational results, with the formatting options including mode selection, cluster selection, and data display adjustment. The final formatted computational results are presented on the graphical user interface for review by an operator.

In an alternate embodiment there is disclosed a system for operating a computer to transform and present data gathered from respondents to electronic surveys to evaluate preferences related to digital two dimensional and three dimensional images. The system includes means for receiving computational results for an electronic survey in the form of data files, which include one or more cluster scores associated with one or more clusters identified in an image presented in an electronic survey. The computational results are transformed for presentation on a graphical user interface. A summary of the computational results for the images viewed in the survey is provided, as is a more detailed display of the survey results for a selected image. To refine the data being presented, parameter filters are provided, with the parameter filters being defined by the characteristics of said images included in the survey and by the data captured about the respondents to the survey. The graphical user interface provides options for presentation of the computational results, with the formatting options including mode selection, cluster selection, and data display adjustment. The final formatted computational results are presented on the graphical user interface for review by an operator.

In yet another embodiment there is disclosed a computer-readable storage medium having computer readable program code embodied in the medium which, when the program code is executed by a computer, causes the computer to perform method steps for transforming and presenting data gathered from respondents to electronic surveys and for evaluating preferences related to digital two dimensional and three dimensional images. The method includes receiving computational results for an electronic survey in the form of data files, which include one or more cluster scores for clusters identified in an image presented in the electronic survey. The computational results are transformed for presentation on a graphical user interface. The method provides a summary of the computational results for all images viewed in the survey and detailed survey results for selected images from the survey. Parameter filters, dependent on the characteristics of the images in the survey and on data captured about the respondents to the survey, are provided to narrow the results presentation. The method further provides formatting options for presentation of the computational results, with the formatting options including mode selection, cluster selection, and data display adjustment. The final formatted computational results are presented on the graphical user interface for review by an operator.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The image evaluation system described herein presents proposed designs to survey respondents, and their feedback is collected via, for example, individual personal computers connected in a network such as an intranet, an extranet, or the internet. It is possible to control the interpersonal dynamics among the respondents. It is also possible to isolate them completely from one another, so that no one of them is aware of the preferences expressed by the other respondents. It is also possible to allow selective levels of information to be shared among the respondents, to initiate a real or virtual group discussion. Furthermore, by connecting respondents via a computer network, it is possible to assemble a group of respondents that are located in very different geographical locales. Time management is also facilitated, as the need to bring together all respondents at the same time is reduced by seamlessly integrating data that is received at different points in time.

For the purposes herein, "products" is intended to be a generic term referring to goods, such as objects intended to be mass produced, and modularized goods such as personal computers or printing devices which comprise a plurality of interchangeable parts suitable for mass customization. "Attributes" of a product, as used herein, is intended to refer to the structural, functional, stylistic, or economic features of the product, and may include such things as cost, color or color combination, size, shape, style, pattern, length, weight, content feature, option, choice of material, etc. The product attributes may be aesthetic or functional. A given product has a series of possible attributes that are combined using the method of the disclosure herein to develop a design. Different types of objects of the design or selection may have different groups of possible attributes. Thus, for example, designs for an aesthetically pleasing exterior appearance of a printing device would have attributes such as material (e.g., plastic or metal), distribution of materials (e.g., plastic sides with metal features), texture, color, color combination, length, width, size of controls, shape of controls, location of controls, color of controls, position of status lights, etc. The term "attribute" denotes both elements that are absolute, in the sense that they are either present in the product or not, and relative, in the sense that an attribute can have many values, or be broken down into many subtypes. An example of the former is the presence or absence of a monitor on a printing device. An example of the latter is the location or size of controls on a printing device.

While for the purposes of explanation the method and system will be described as functioning within a network including various printing and communication devices, it will be appreciated by those skilled in the art that the system and method for product design evaluation may be beneficially utilized in any communication environment. All such variations and modifications are fully contemplated by the scope of the specification and claims herein.

Various computing environments may incorporate capabilities for supporting document communication capabilities utilizing facsimile controllers and equipment on which the facsimile controller may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, mini-computers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 1:
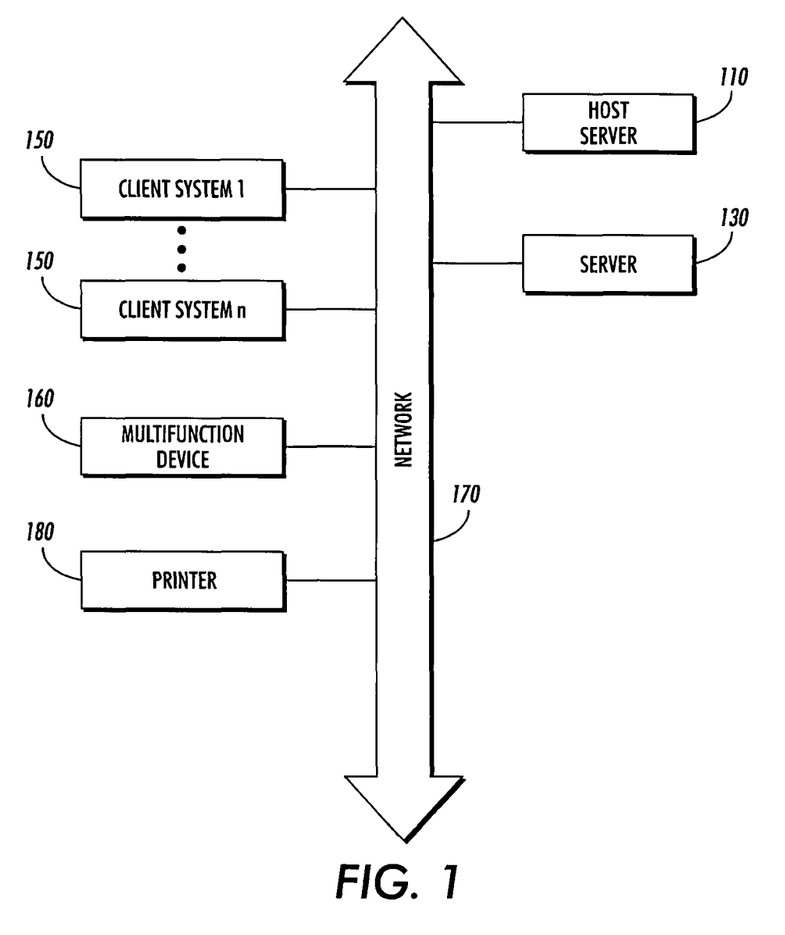
FIG. 1 is a block diagram of the operating environment for a system that provides computer operated product design evaluation.

Referring to FIG. 1, the block diagram illustrates an example embodiment of a product design evaluation system in a networked environment. The network environment may contain client systems 150 through which users can access printers 180, multifunction device 160 and other devices connected to the network. The server 130 is a shared/private document repository. It also provides storage for the print server, containing, for example, historical printing information, logs, etc. for the printers controlled by the print server. Host server 110 hosts the modules of the product design evaluation system, including the input module, analysis module, and viewing module, which are discussed in more detail herein below with respect to FIG. 2.

All these main components are coupled together via network 170. The system and method herein are not limited to a particular type of network system 170 and may include a local-area network (LAN) such as an Ethernet network or a wide area network (WAN) such as the Internet or the World Wide Web. Client systems 150 can be connected to the network 170 through a variety of connections including standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, Net BIOS, Ethernet, RS232, and direct asynchronous connections). For example, the network 170 may be a corporate intranet connecting decision makers in an organization to a centralized decision engine, or it may be a secure extranet or virtual private network connecting different entities such as a company's suppliers or consultants to the company's design engine. Such networking environments are commonplace in offices, enterprise-wide computer networks, intranets and the Internet. Those skilled in the art will appreciate that the principles of the system and method described herein can be applied to virtually any network system without departing from the scope of the claims and specification.

The client systems 150 may be any personal computer, Windows-based terminal, network computer, wireless device, information appliance, X-device, workstation, mini-computer, mainframe computer, personal digital assistant, or other computing device and typically have a processor, random-access memory, read-only memory, and one or more storage devices, such as a hard drive, CD-ROM, DVD, diskette, etc. In the embodiments herein, client systems 150 may use any one of a number of windows-oriented operating systems. The processor is coupled to an output device, such as a display device, input devices, such as a keyboard, mouse, or pointer, and communication circuitry. The output device, for example, a monitor, displays information for viewing by a user of personal computer 150 and an input device is used to control a screen pointer provided by the graphical user interface of the operating system. The output device may comprise a computer, a television, or other electronic device coupled wirelessly or via wires to a server. The system and method herein are not limited to any particular output or input device.

Multifunction device 160 may be any device capable of scanning and transmitting image material, printing, copying, or transmitting facsimile images. Operation of multifunction device 160 is controlled from a user interface, which enables a user to select the function to be performed as well as enter information required by the device to perform an operation. Typically buttons or a keypad are utilized to enter information and select functionality, but a touch screen or any other means known in the art may be utilized. Multifunction device 160 communicates with print server 130 as well as host server 110 and client systems 150.

Figure 2:
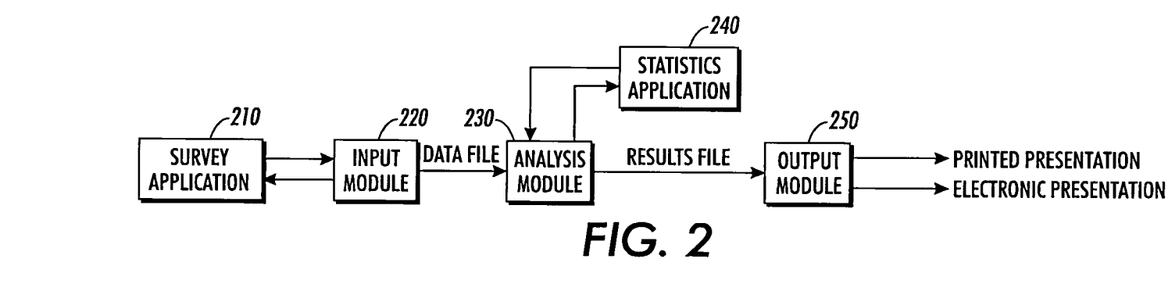
FIG. 2 is a block diagram of one embodiment of a system that provides computer operated product design evaluation.

Turning now to FIG. 2, one example embodiment of the system for product design evaluation or image evaluation is described. The evaluation system utilizes a set of uniquely designed software modules: an input module 220 to gather respondents' input, an analysis module 230 to process the resulting data from the input module, and an output module 250 for viewing the data. Input module 220 operates in conjunction with a commercially available electronic survey application 210 to permit survey respondents to provide input about selected areas of images. Any of various online survey tools could be utilized, including Vantage Point, Perseus, WebSurveyor, Survey-Monkey, iSalient, Key Survey, and Zoomerang, among others. In operation, the Input Module pulls variables that are set in the standard survey interface. These variables include, for example, instructional text, positive and negative area labels, the attributes presented for each area, the maximum number area designations allowed, and the image. These variables are used to populate the custom template.

After a survey respondent inputs data, the x and y and width and height coordinates, selected attributes and text comments for each area designation are returned to the survey tool and placed in a data file. Input module 220 enables respondents to use a custom drawing tool to designate areas of interest on digital images of three dimensional product concepts (or any image) that are presented in two-dimensional space within an electronic survey. The "designated area" data is comprised of the X and Y coordinates and width and height of the areas of images that respondents identify. Additionally, the input module 220 permits respondents to provide opinions (for example, ratings and/or comments) about the designated areas they identify. This information is saved in a machine-readable file for analysis. One embodiment of input module 220 is described more fully in co-pending application U.S. application Ser. No. 11/717,856, filed Mar. 14, 2007, titled "Graphical User Interface for Gathering Image Evaluation Information".

Analysis module 230 receives the machine-readable file (Data File 1) from input module 220 and enables an automated analysis of the "designated area" data collected by the input module. Specifically, it utilizes multivariate exploratory techniques to analyze the coordinates of the "designated area" data and employs a unique scoring algorithm to identify the most significant areas of interest. It also enables "what if" scenarios to allow the data to be evaluated in multiple ways by changing parameter settings and links respondent comments and ratings to the significant areas of interest. This information is saved in a machine-readable file for analysis (Results File 1). Statistics application 240 communicates with analysis module 230 and performs cluster analysis of the data as specified by analysis module 230. For example, the analysis module passes a block of data plus the parameters set in the module to the statistics application, for example, R, which determines the cluster assignments and heat mapping and sends the cluster and heat mapping results back to the analysis module.

For each image, the analysis module calculates the total number of respondents, positive and negative cluster scores, the number of positive and negative areas designated, the number of positive and negative comments, and the number of positive and negative attributes. For each cluster, the analysis module calculates a cluster score, the number of respondents, number of areas, number of areas with attributes, number of areas with comments, and the percentage of areas with each attribute checked. The analysis module compiles the data blocks, associates comments with clusters, converts the data to XML format, and writes the final output files. Additional exploratory statistical methods may be added, such as multidimensional scaling, principal component analysis, factor analysis, correspondence analysis, and other multidimensional techniques. One embodiment of an output module is described in more detail in co-pending application U.S. application Ser. No. 11/724,008, filed Mar. 14, 2007, titled "Method and System for Image Evaluation Data Analysis".

Output module 250 enables an operator to easily view and understand the analysis of the data. It receives results files from analysis module 230 and transforms the computational results into a display that is superimposed over the original product images, thus providing an easily understood interpretation of the data. A top-level summary of the data is provided to enable the operator to compare respondent responses to all images that were evaluated. Additionally, it provides detailed results of each image that was evaluated, displaying the most important elements of the original images based on the original respondent selections along with associated comments and ratings. The data may be viewed, filtered by parameters like positive feedback, negative feedback, country, and type of respondent. Output module 250 also provides a variety of ways to select and adjust the appearance of the display of the data. The output may be viewed in the form of either a printed or electronic presentation. While the product design evaluation system consists of three modules that are designed to work with each other, each module is a separate entity and may be used independently of the other modules for other applications.

The particular methods performed by the image evaluation system comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 3:
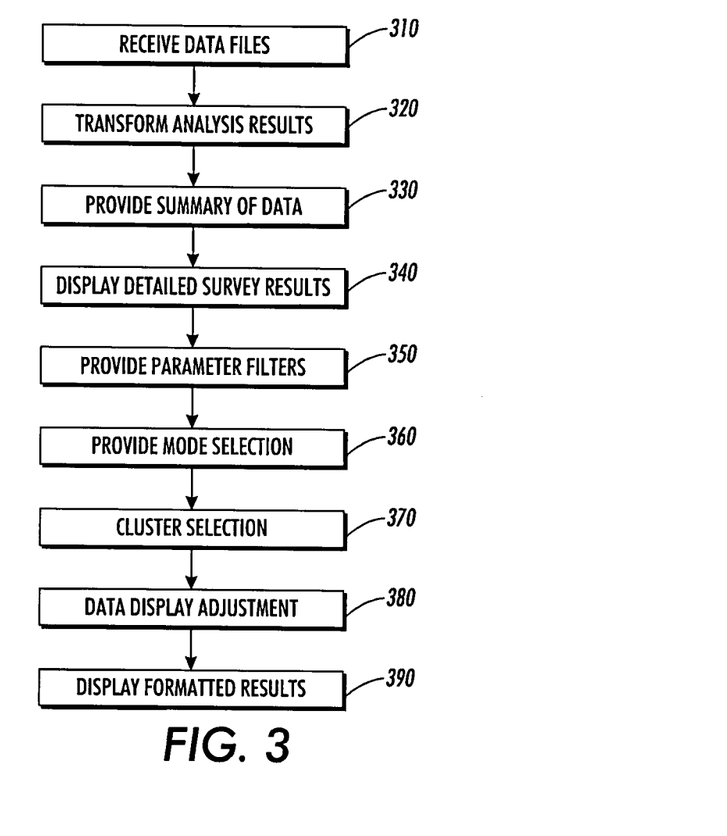
FIG. 3 is a flow diagram that illustrates an embodiment of the method of operation of the output module of the product design evaluation system.

Turning now to FIG. 3, there is shown operation of one example embodiment of the method for presentation of survey results through a graphical user interface associated with an output module. The output module enables viewing and understanding of the data developed by an analysis module and provided to the output module in a machine-readable file. At 310 the output module receives computational results in the form of data files from an analysis module. The output module transforms the computational results at 320 and presents them on a graphical user interface, discussed in more detail with reference to FIGS. 4 through 10 herein below.

The output module presents the operator with a view of the product design(s) or image(s) reviewed in an electronic survey on the graphical user interface at 330 with a summary of the data associated with each image to enable comparison of the responses to all of the image(s) viewed by the survey respondents. Upon selection of an individual image, detailed survey results are presented for the selected image at 340. The detailed survey results include identification of the image features receiving the greatest cluster analysis score and the associated comments and ratings from the survey respondents. To facilitate review of the data, the subject cluster(s) are displayed superimposed over the image selected by the operator. The graphical user interface of the output module also provides parameter filters to narrow the results review as desired. Filters are dependent on the specific survey and data captured about respondents and may include country, respondent type, purchased in last year, planning to purchase, technology adoption, age, gender, professional role, market segment, color or mono equipment use, as well as other possible options known in the art.

The output module graphical user interface provides mode selection capability at 360. Mode selection enables an operator to view the data results as clusters or as a heatmap. Clusters are presented as delineated areas, for example, in the form of boxes, enclosing an area of interest in an image. Three values of the clusters are displayed—the centroid, the average area and the maximum area of all designated areas that form a cluster. Depending on the survey responses, the individual clusters may be ranked according to cluster score. Additionally, category identifier(s) may be applied to each cluster, such as "positive" or "negative". The clusters and category identifiers may be differentiated by color coding, shading, pattern, or other techniques known in the art. If the heatmap mode is selected, the centers of all areas designated are displayed and these centers may be differentiated by various techniques, such as color coding, patterns, or shading. The heatmap is a representation of the raw data, whereas the clusters are the results of the cluster analysis.

The graphical user interface provides cluster selection capability at 370. The clusters identified by the survey results are listed for the operator to select as many individual clusters as desired for closer review. The selected clusters are displayed superimposed over the survey image and the detailed survey results for each cluster with its attributes and comments are provided in text. The output module graphical user interface also provides data display adjustment at 380 to enable an operator to adjust such features as cluster opacity, heatspot color density, centroid diameters, and centroid/cluster colors. At 390 the survey results data, formatted in its final form as selected by an operator, is presented to an operator for review.

Figure 4:
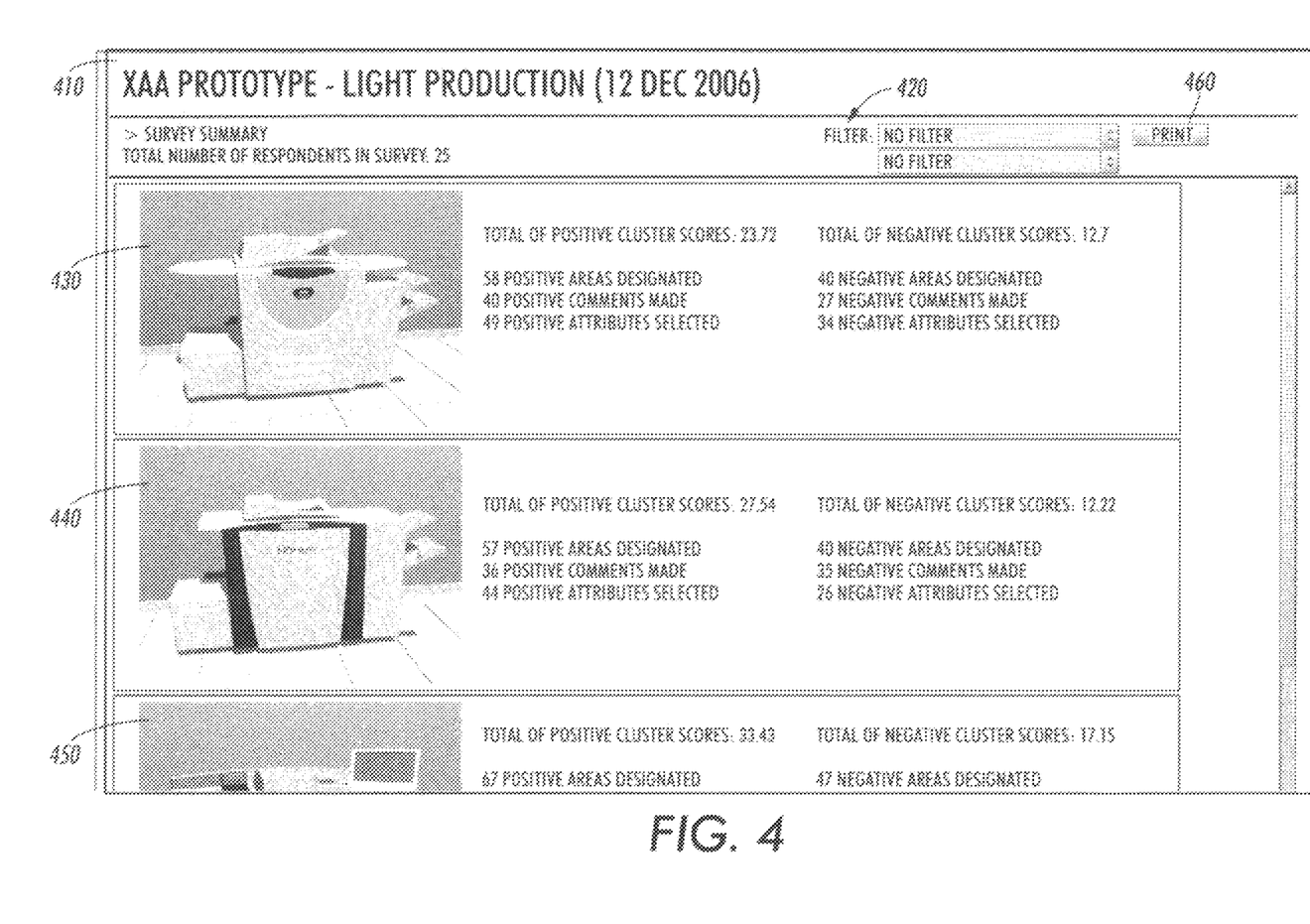
FIG. 4 is an example embodiment of a dynamic graphic display of the output module illustrating the survey results summary presentation.

Turning now to FIGS. 4 through 10, there are illustrated example embodiments of the graphical user interface of the output module showing the survey results and options for customizing the presentation of the results as desired by an operator. FIG. 4 shows the survey results in summary view. In this view, the product images 430, 440, and 450 evaluated in the survey are presented to an operator with a brief description of the total of positive cluster scores and total of negative cluster scores received by each product image from survey respondents. While for the purposes of this embodiment three product images are illustrated, it is noted that a single image or multiple images could be have been evaluated and summarized for an operator. The descriptive title 410 indicates the subject of the survey. Filter selection area 420 provides the capability of selecting from among a list of available filters, including country, respondent type, purchased in last year, planning to purchase, and technology adoption, among other possible options. As will be appreciated by those skilled in the art, filters are dependent on the specific survey and data captured about respondents. Other possible filters may include, for example, age, gender, professional role, market segment, color or mono equipment use, among others, all of which are contemplated by the specification and scope of the claims herein. Print capability 460 is provided to enable the operator to print copies of the initial summary screens. To review a single image in depth, the operator selects the image of interest utilizing any method known in the art.

Figure 5:
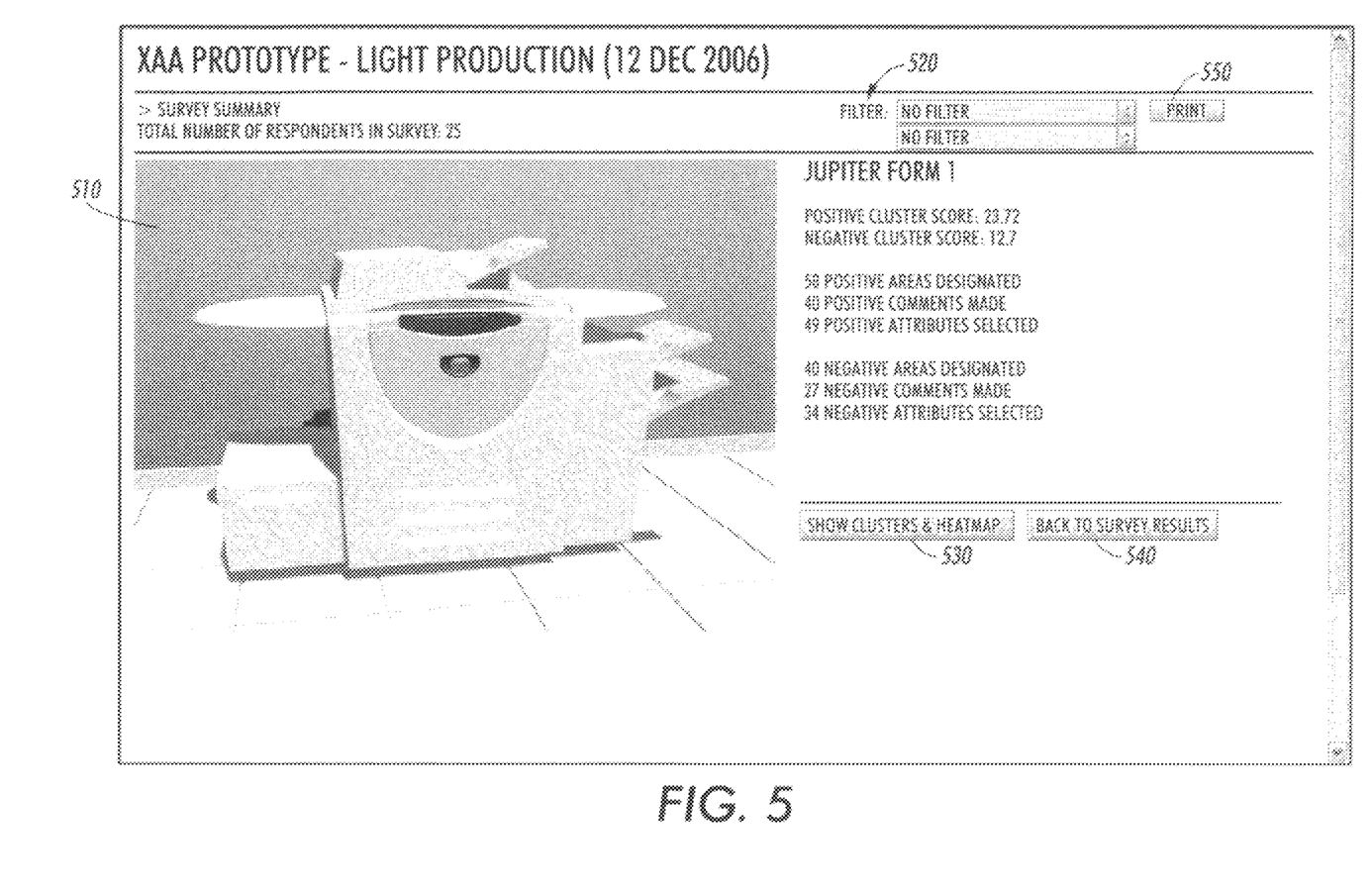
FIG. 5 is an example embodiment of a dynamic graphic display for a selected image from the summary presentation of FIG. 4.

Turning now to FIG. 5, an example embodiment of the graphical user interface after a single image has been selected is illustrated. In this view, image 510 includes a brief summary of the positive and negative cluster scores which have been developed by the analysis module and provided to the output module. Also included is filter selection capability 520, discussed in more detail with reference to item 420 in FIG. 4 above. Selection of the "Back to survey summary" button 540 returns the operator to the initial survey screen, enabling selection of a different image. Selection of the "Show clusters and heatmap" button presents the operator with the view illustrated in FIG. 6 enabling more detailed specification of the presentation of the survey results, as does selecting the image itself.

Figure 6:
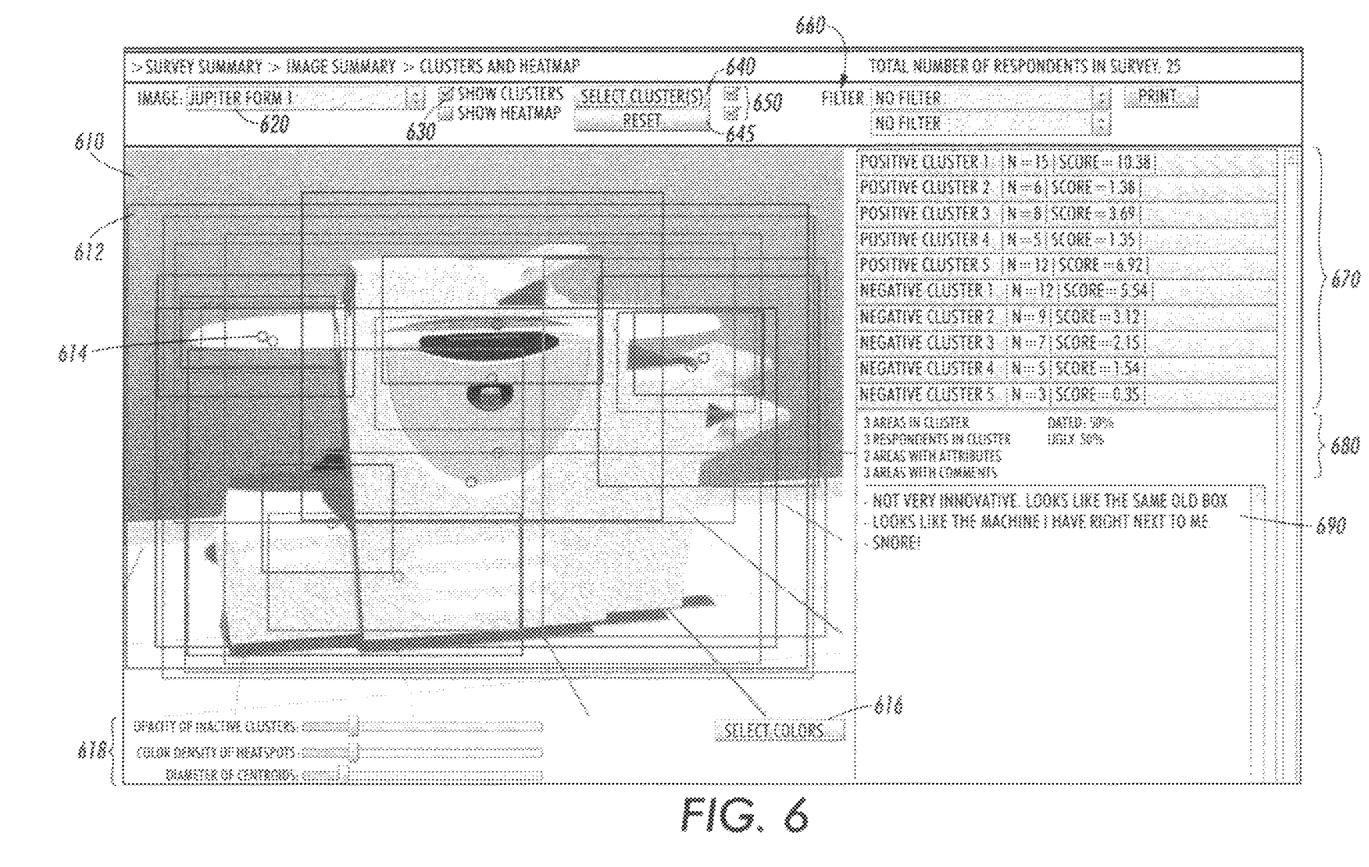
FIG. 6 is an example embodiment of a dynamic graphic display of a cluster view for a selected image from the summary presentation of FIG. 4.

Referring to FIG. 6, an example embodiment of the graphical user interface after the operator has selected the "show clusters" feature 630. In this view image selection item 620 provides a drop down menu (illustrated in FIG. 7) enabling selection of a specific survey image, in this embodiment shown as 610. Because "show clusters" feature 630 has been selected as the data presentation mode, the clusters 612 identified by cluster analysis are presented, with cluster centroids 614 indicated. The positive and negative clusters may be differentiated by color coding, shading, or other techniques known in the art. Select clusters feature 640 enables the operator to select individual clusters for review, as illustrated and discussed with respect to FIG. 8.

Category selection 650 provides the capability for an operator to select various categories relating to the survey. In this example embodiment, the categories are positive clusters and negative clusters. Filter selection 660 enables a user to select from among a list of available filters, including country, respondent type, purchased in last year, planning to purchase, and technology adoption, among other possible options. As will be appreciated by those skilled in the art, filters are dependent on the specific survey and data captured about respondents. The clusters represented in the view of the image 610 are listed at 670, with the number of respondents selecting the cluster and the cluster score determined by cluster analysis and score evaluation, as discussed hereinabove.

A summary of the numerical data associated with the clusters is presented at 680, including the number of areas in a cluster, the number of respondents in a cluster, the number of areas with attributes identified, the number of areas in which the respondents made comments, and the percentage of designated areas within the cluster that had specific attributes associated with them. The comments made by the respondents are presented at 690. Item 618 provides the capability to adjust the opacity of inactive clusters, the color density of heatspots, and the diameter of centroids. The initial view includes all clusters until the operator selects specific clusters for review. After specific clusters are selected an operator can return to this initial view by selecting the Reset button 645. Button 616 provides color selection capability for the cluster outlines, centroids, and heatspots. When the Select Colors button 616 is selected the operator is presented with a window from which the operator can directly type in a hexadecimal color value or select a palette icon, which presents the operator with a color selection window for adjustment of hue, saturation, lightness, or RGB values to create a specific color. When color selection is complete, the chosen color is used to represent the appropriate clusters and heatmaps (positive or negative in this example embodiment).

Figure 7:
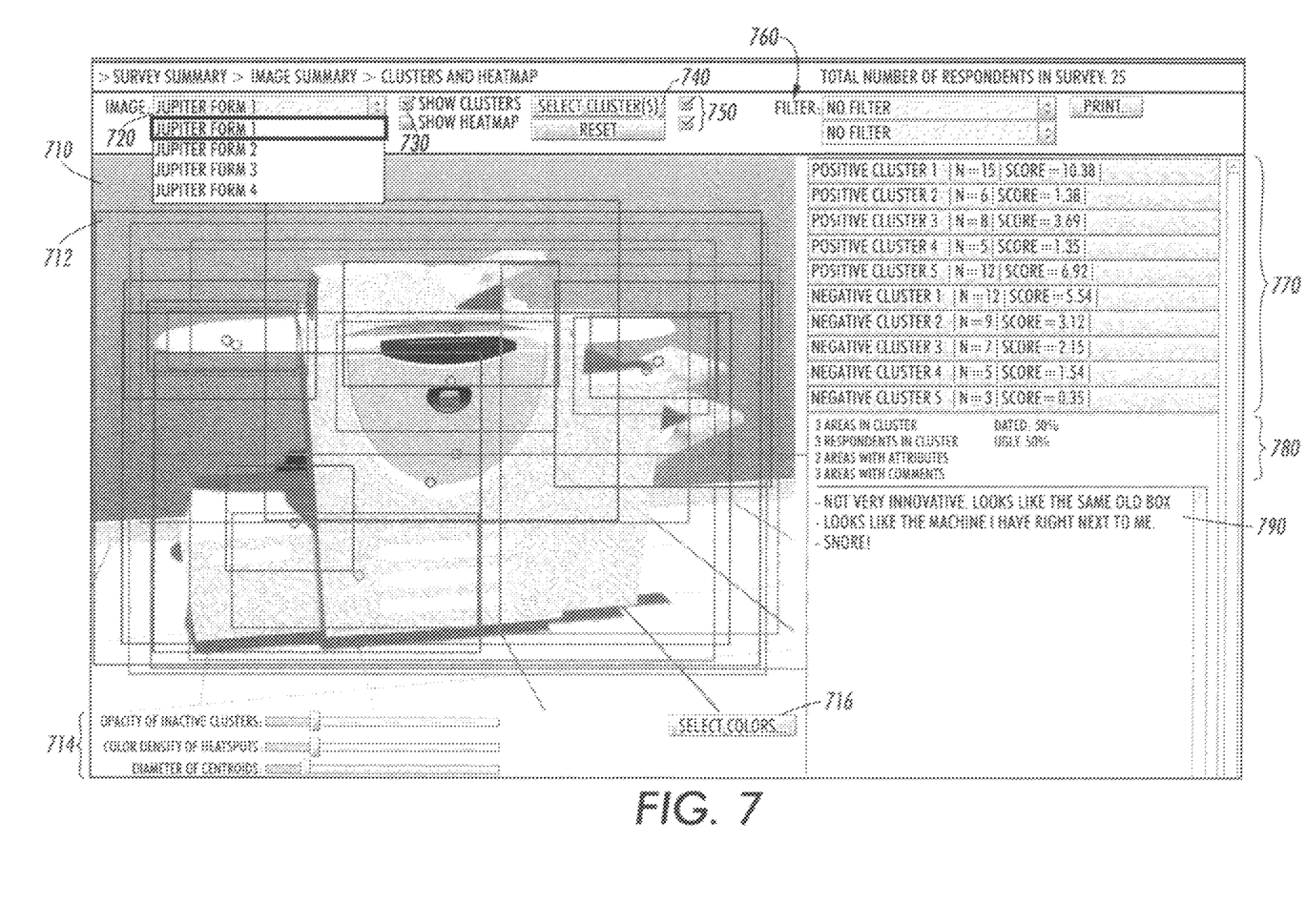
FIG. 7 is an example embodiment of a dynamic graphic display of cluster image selection.

Referring now to FIG. 7, an example embodiment of the graphical user interface displaying an example embodiment of image selection is illustrated. In this view a drop down menu appears when image feature 720 is selected. From this menu an operator may select the image desired to be viewed. Although a drop down menu is illustrated for this embodiment, those skilled in the art will appreciate that any mutually exclusive selection widget may be utilized, for example, radio buttons. In this embodiment, "Jupiter Form 1" is identified as the image currently being viewed.

Figure 8:
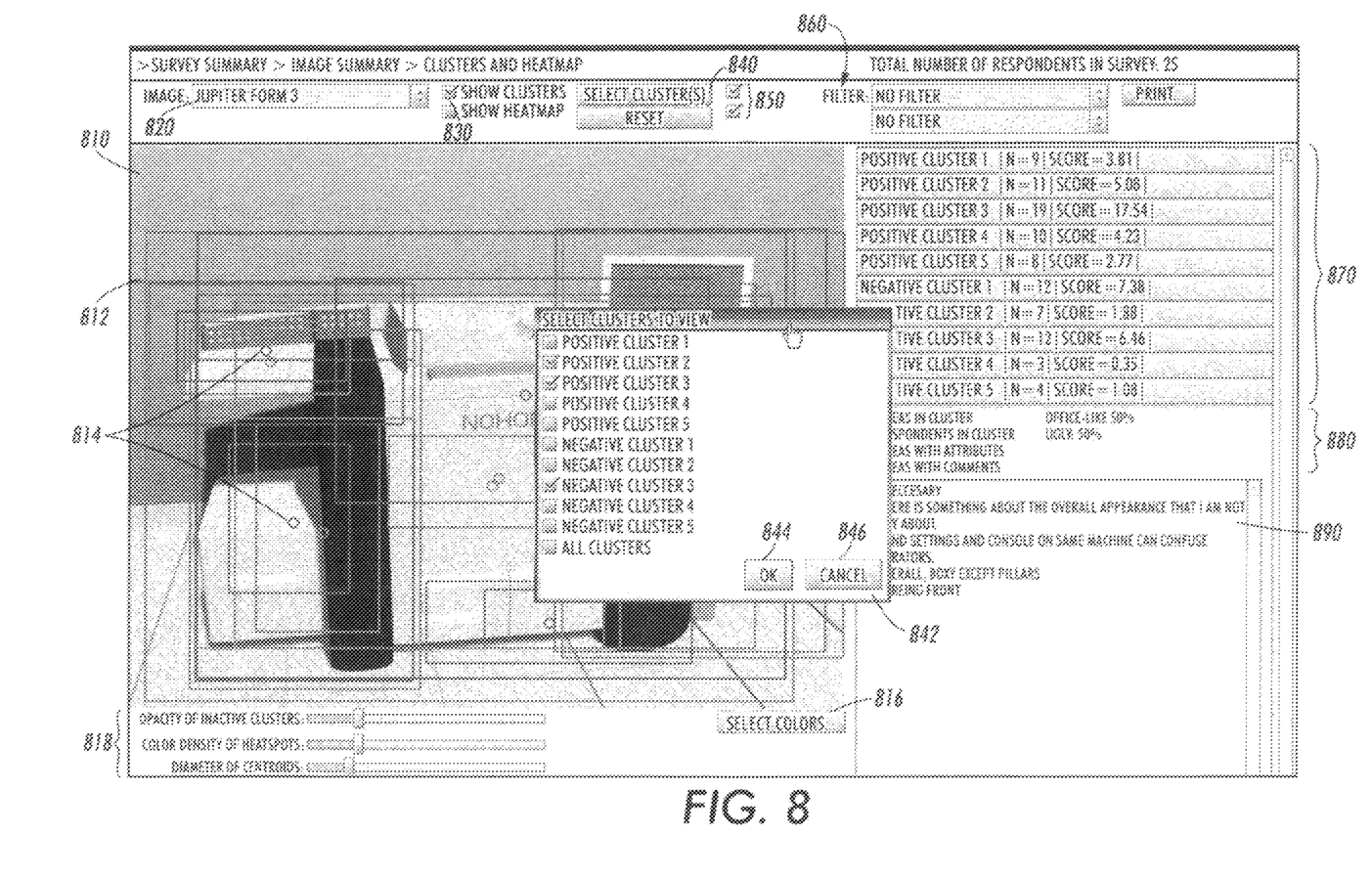
FIG. 8 is an example embodiment of a dynamic graphic display of cluster selection for an image.

Turning now to FIG. 8, an example embodiment of the graphical user interface displaying the cluster selection feature is illustrated. In this embodiment, image selection 820 indicates that image "Jupiter Form 3" has been selected and appears in image screen 810. Because "show clusters" feature 830 has been selected as the display mode, the clusters 812 identified by cluster analysis are presented, with cluster centroids 814 indicated. The positive and negative clusters may be differentiated by color coding, shading, or other techniques known in the art. Select clusters feature 840 enables the operator to select individual clusters for review, by presenting a menu of the clusters identified for this image in 842. The operator may select the clusters to be retained in the view of the image and accept the selections by using the soft button 844. Alternatively, the operator may indicate that individual clusters selections will not be made by activating the cancel feature 846.

Category selection 850 provides the capability for an operator to select various categories relating to the survey. In this example embodiment, the categories are positive clusters and negative clusters. Filter selection 860 enables a user to select from among a list of available filters, including country, respondent type, purchased in last year, planning to purchase, and technology adoption, among other possible options. As will be appreciated by those skilled in the art, filters are dependent on the specific survey and data captured about respondents. The clusters represented in the view of the image 810 are listed at 870, with the number of respondents who designated areas that make up the cluster and the cluster score determined by cluster analysis and score evaluation, as discussed hereinabove. A summary of the numerical data associated with the clusters is presented at 880, including the number of areas in a cluster, the number of respondents in a cluster, the number of areas with attributes identified, the number of areas in which the respondents made comments, and the percentage of designated areas within the cluster that had specific attributes associated with them. The comments made by the respondents are presented at 890. Item 818 provides the capability to adjust the opacity of inactive clusters, the color density of heatspots, and the diameter of centroids. Button 816 provides color selection capability, as described above with reference to item 616 in FIG. 6.

Figure 9:
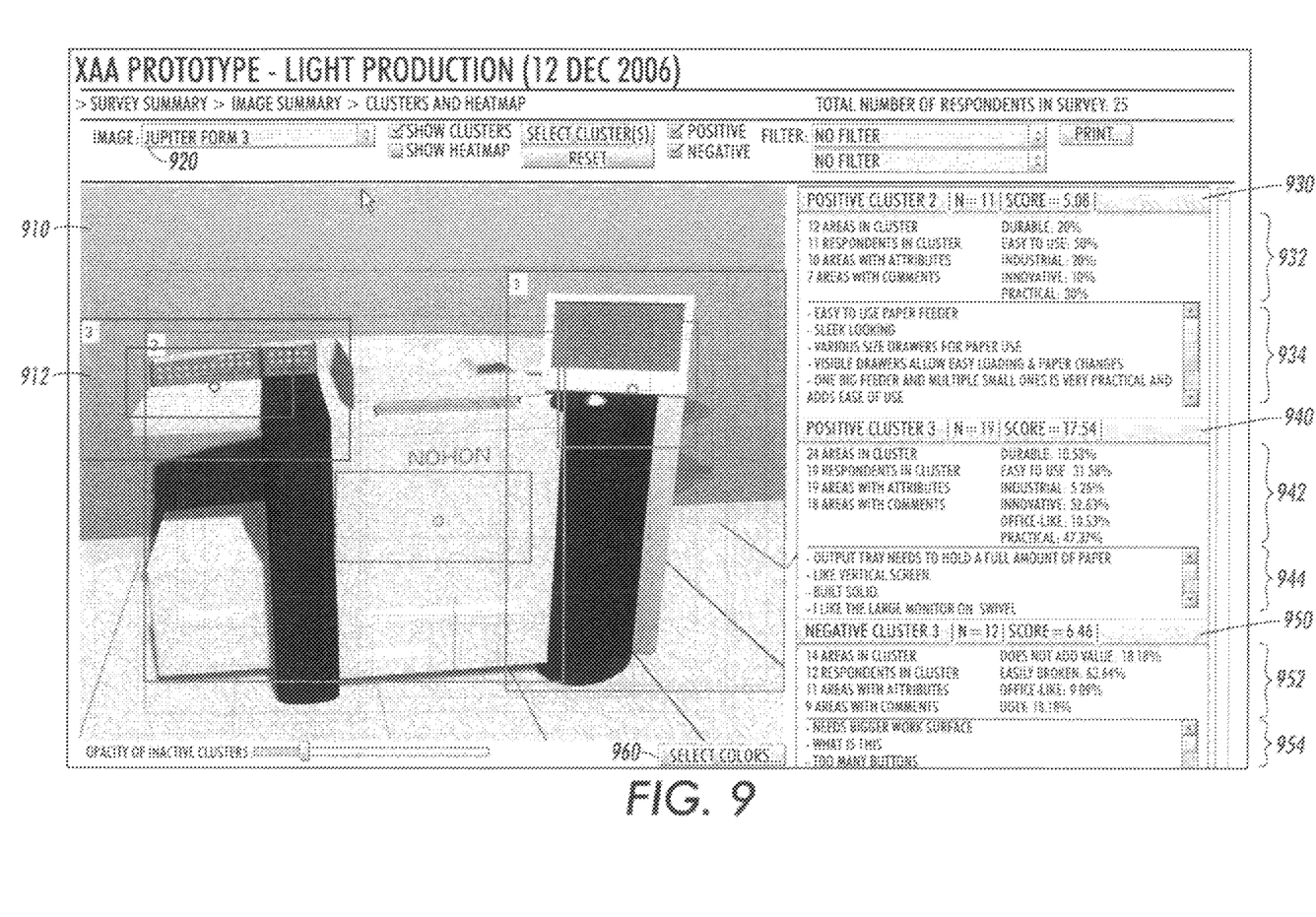
FIG. 9 is an example embodiment of a dynamic graphic display of selected clusters for an image.

Referring to FIG. 9, an example embodiment of the graphical user interface displaying the selected clusters view is illustrated. In this view of the interface, image selection feature 920 indicates the current image being viewed with a graphic of the image in subscreen 910. The selected clusters 912 are shown as being bolder in outline than the inactive clusters and are numbered. The positive and negative clusters may be differentiated by color coding, shading, or other techniques known in the art. Each individual cluster is listed and the data relating to it is presented. For example, positive cluster 2 is presented at 930 and a summary of the numerical data associated with the clusters is presented at 932, including the number of areas in a cluster, the number of respondents in a cluster, the number of areas with attributes identified, and the number of areas in which the respondents made comments, as well as the percentage of designated areas within the cluster that had specific attributes associated with them. For example, for the attribute "Durable", 20% of the survey participants designating areas that make up positive cluster 2 associated the attribute "Durable" with the designated area. The comments made by the respondents are presented at 934. Similarly, positive cluster 3 is presented as item 940 with a summary of the numerical data presented at 942 and respondent comments presented at 944. Negative cluster 3 is presented as item 950 with a summary of the numerical data presented at 952 and respondent comments presented at 954.

Figure 10:
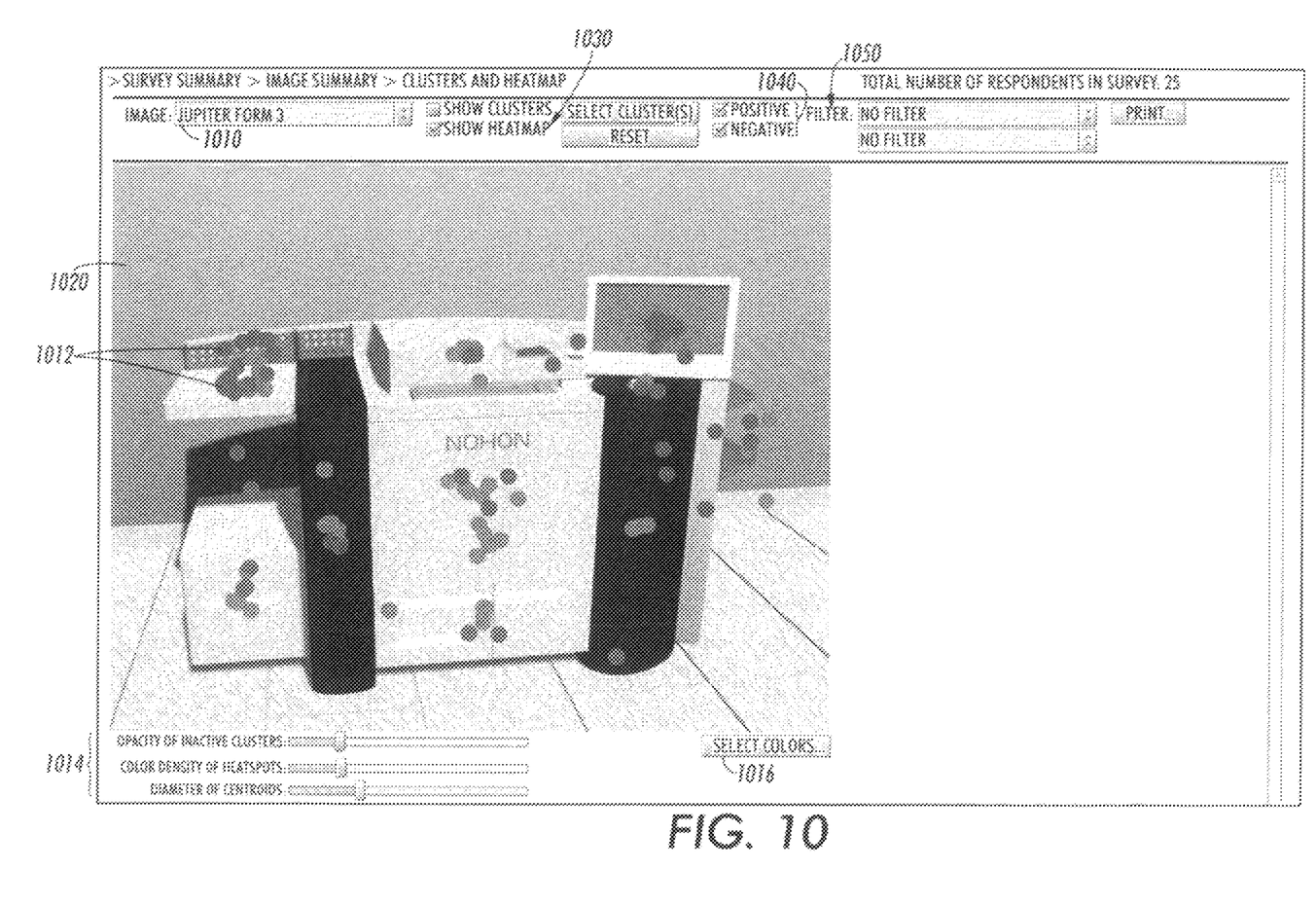
FIG. 10 is an example embodiment of a dynamic graphic display of a heat map view for a selected image from the summary presentation of FIG. 4.

Turning now to FIG. 10, an example embodiment of the graphical user interface displaying the heatmap mode is illustrated. In this view, image feature 1010 indicates that "Jupiter Form 3" has been selected and is presented in the view of 1020. Because the show heatmap mode 1030 has been selected as the display mode, the centers of the designated areas are shown. Feature 1014 provides the capability of adjusting the opacity of inactive clusters, the color density of heatspots, and the diameter of centroids. In this embodiment the category selection feature 1040 provides the ability to select presentation of positive, negative, or both positive and negative heatspots in the image. Filter selection 1050 enables a user to select from among a list of available filters, including country, respondent type, purchased in last year, planning to purchase, and technology adoption, among other possible options. As will be appreciated by those skilled in the art, filters are dependent on the specific survey and data captured about respondents.

For the purposes of discussion, the above description is directed to product design evaluation for printing devices. However, the method, system, and user interface could be beneficially applied to any application utilizing either two dimensional or three dimensional images. One such example, among many, is analysis of medical imaging. In this case, if a chest X-ray is being considered, the categories may be heart or lung rather than positive or negative. The filters could be used to view malignant vs. benign areas. The image selection menu could be used to view various X-rays. Alternate examples include quality assurance or visual defect investigation. In this case, there may be just one category for area selection: defect. And the menu selection could be all possible departments or assembly line areas that could have produced or been responsible for the defect.

While the present discussion has been illustrated and described with reference to specific embodiments, further modification and improvements will occur to those skilled in the art. For example, the ability to crop out the specific part of the image that is included in the top scoring clusters and have a "proof sheet" view may be provided. This view would be a group of thumbnails of only the selected part of the image. The ability to specify which particular clusters were selected for the thumbnails, rearrange or reorder the thumbnails, and print the proof sheet may also be included. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for operating a computer to transform and present data gathered from respondents to electronic surveys to evaluate preferences related to digital images, the method comprising:
   receiving, by the computer, a plurality of surveys wherein, each survey comprises user responses corresponding to at least one image and an identified area of the at least one image;
   displaying the at least one image by the computer;
   identifying, by the computer, area data in the at least one image, corresponding to the identified area;
   determining, by the computer, for the at least one image, clusters based on said area data, and a cluster score for each cluster;
   generating parameter filters, by the computer, based on the user responses;
   determining, by the computer, a maximum score of the cluster scores and the cluster with the maximum score; and
   displaying a summary comprising the parameter filters and the cluster with the maximum score.

2. The method according to claim 1, wherein said summary further comprises a plurality of images with a data summary for each of said plurality of images.

3. The method according to claim 2, wherein said data summary comprises an indication of at least one positive cluster score and an indication of at least one negative cluster score for each said plurality of images.

4. The method according to claim 1, wherein said summary further comprises detailed survey results comprising at least one member selected from the group comprising survey respondent comments associated with at least one image feature and ratings associated with said at least one image feature.

5. The method according to claim 4, wherein said detailed survey results are presented as clusters superimposed over said at least one image.

6. The method according to claim 1, wherein said parameter filters comprise at least one member selected from the group comprising country, year of purchase, purchase plans, technology adoption, market segment, color or monotone equipment use, respondent type, age, gender, and professional role.

7. The method according to claim 1, further comprising displaying a heatmap over said at least one image, wherein said heatmap corresponds to raw data from the user responses.

8. The method according to claim 1, wherein a user selection of a cluster enables viewing of computational results presented as at least one delineated area enclosing an area of interest on said at least one image.

9. The method according to claim 7, wherein user selection of a portion of the heatmap enables displaying of data from said user responses as center points of at least one area of interest.

10. The method according to claim 1, further comprising:
    receiving a selection for at least one cluster;
    displaying said at least one cluster superimposed over said at least one image; and
    displaying detailed user response results for each said at least one cluster with attributes and survey respondent comments associated with said at least one cluster.

11. The method according to claim 10, wherein said detailed user response results comprise at least one member selected from the group comprising number of areas in said at least one cluster, number of respondents for said at least one cluster, number of areas within said at least one cluster with attributes identified, number of areas within said at least one cluster in which respondents made comments, and percentage of designated areas within said at least one cluster that had specific associated attributes.

12. The method according to claim 1, wherein each cluster score comprises at least one member selected from the group comprising cluster centroid, cluster average area, and maximum area of designated areas forming said cluster, wherein said designated areas comprise areas of images that respondents identify in the plurality of surveys.

13. The method according to claim 1, wherein said clusters are ranked according to said cluster score.

14. The method according to claim 1, wherein at least one category identifier is applied to each cluster, wherein said at least one category identifier is dependent on a subject matter of said plurality of surveys.

15. The method according to claim 1, wherein displaying said at least one image comprises displaying the at least one image with a data display adjustment, wherein the data display adjustment comprises at least one member selected from the group comprising cluster opacity, heatspot color density, centroid diameter, and centroid/cluster color selection.

16. The method according to claim 1, further comprising:
    specifying clusters for thumbnails;
    reordering said thumbnails; and
    providing a proof image for review.

17. A system for operating a computer to transform and present data gathered from respondents to electronic surveys to evaluate preferences related to digital images, the system comprising:
    a processing system comprising one or more processors; and
    a memory system comprising one or more computer-readable media, wherein the one or more computer-readable media contain instructions that, when executed by the processing system, cause the processing system to perform operations comprising:
        receiving a plurality of surveys, wherein each survey comprises user responses corresponding to at least one image and an identified area of the at least one image;
        displaying the at least one image;
        identifying area data in the at least one image, corresponding to the identified area;
        determining for the at least one image, clusters based on said area data, and a cluster score for each cluster;
        generating parameter filters based on the user responses;
        determining a maximum score of the cluster scores and the cluster with the maximum score; and
        displaying a summary comprising the parameter filters and the cluster with the maximum score.

18. The system according to claim 17, wherein said summary further comprises detailed survey results comprising at least one member selected from the group comprising survey respondent comments associated with at least one image feature and ratings associated with said at least one image feature.

19. The system according to claim 17, the operations further comprising displaying a heatmap over said at least one image, wherein said heatmap corresponds to raw data from the user responses.

20. The system according to claim 17, wherein a user selection of a cluster enables viewing of computational results presented as at least one delineated area enclosing an area of interest on said at least one image.

21. The system according to claim 19, wherein user selection of a portion of the heatmap enables displaying of data from said user responses as center points of at least one area of interest.

22. The system according to claim 17, the operations further comprising
- receiving a selection for at least one cluster;
- displaying said at least one cluster superimposed over said at least one image; and
- displaying detailed user response results for each said at least one cluster with attributes and survey respondent comments associated with said at least one cluster.

23. The system according to claim 22, wherein said detailed user response results comprise at least one member selected from the group comprising number of areas in said at least one cluster, number of respondents for said at least one cluster, number of areas within said at least one cluster with attributes identified, number of areas within said at least one cluster in which respondents made comments, and percentage of designated areas within said at least one cluster that had specific associated attributes.

24. The system according to claim 17, wherein at least one category identifier is applied to each cluster, wherein said at least one category identifier is dependent on a subject matter of said plurality of surveys.

25. A non-transitory computer-readable storage medium having computer readable program code embodied in said medium which, when said program code is executed by a computer causes said computer to perform method steps for transforming and presenting data gathered from respondents to electronic surveys to evaluate preferences related to digital images, the method comprising:
- receiving a plurality of surveys, wherein each survey comprises user responses corresponding to at least one image and an identified area of the at least one image;
- displaying the at least one image;
- identifying area data in the at least one image, corresponding to the identified area;
- determining for the at least one image, clusters based on said area data, and a cluster score for each cluster;
- generating parameter filters based on the user responses;
- determining a maximum score of the cluster scores and the cluster with the maximum score; and
- displaying a summary comprising the parameter filters and the cluster with the maximum score.

* * * * *